(12) United States Patent
Ramani et al.

(10) Patent No.: US 8,578,168 B2
(45) Date of Patent: Nov. 5, 2013

(54) METHOD AND APPARATUS FOR PREPARING AND VERIFYING DOCUMENTS

(75) Inventors: Srinivasan Ramani, Karnataka (IN); Darpan Goel, Karnataka (IN); Anil Kumar, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1194 days.

(21) Appl. No.: 11/905,478

(22) Filed: Oct. 1, 2007

(65) Prior Publication Data
US 2008/0101601 A1 May 1, 2008

(30) Foreign Application Priority Data
Oct. 30, 2006 (IN) .......................... 1982/CHE/2006

(51) Int. Cl.
*H04L 9/32* (2006.01)
(52) U.S. Cl.
USPC .......................................................... 713/176
(58) Field of Classification Search
USPC .......................................... 380/51; 713/176
See application file for complete search history.

(56) References Cited

U.S. PATENT DOCUMENTS

| | | | | |
|---|---|---|---|---|
| 5,157,726 A | * | 10/1992 | Merkle et al. | 713/176 |
| 5,966,451 A | * | 10/1999 | Utsumi | 380/51 |
| 6,195,677 B1 | * | 2/2001 | Utsumi | 709/201 |
| 2002/0069179 A1 | * | 6/2002 | Slater et al. | 705/67 |
| 2002/0095383 A1 | * | 7/2002 | Mengin et al. | 705/50 |
| 2004/0100363 A1 | | 5/2004 | Lane et al. | |
| 2005/0234857 A1 | | 10/2005 | Plutchak et al. | |
| 2006/0020803 A1 | | 1/2006 | O'Hagan | |
| 2008/0101601 A1 | * | 5/2008 | Ramani et al. | 380/51 |

FOREIGN PATENT DOCUMENTS

WO 2004015918 A1 2/2004

* cited by examiner

*Primary Examiner* — Peter Shaw
*Assistant Examiner* — Dao Ho

(57) ABSTRACT

A method for preparing and verifying a document, comprising the steps of: presenting the document to a document-registering office in a machine-readable format; editing the document to add an identification code associated with a non-copiable object; signing the edited document using a private key of the document-registering office; printing the digitally signed document in a machine-readable form; presenting the document and the object to an inspecting authority; recovering the digitally signed document from the machine-readable form of the printed document; verifying the digital signature of the document-registering office; and verifying that the identification code in the document corresponds to that of the presented object.

11 Claims, 3 Drawing Sheets

METHOD AND APPARATUS FOR PREPARING AND VERIFYING DOCUMENTS

This application claims priority from Indian patent application 1982/CHE/2006, filed on Oct. 30, 2006. The entire content of the aforementioned application is incorporated herein by reference.

BACKGROUND OF THE INVENTION

Seals were once used to verify the authenticity of documents on clay tablets in Mesopotamia. Even with the invention of paper, they continued to be used along with a wax impression to authenticate the approval of a signatory to a document. Subsequently, with the advent of handwriting, signatures became the most popular and common mode of authentication of paper documents. Even today, government departments in many countries authenticate paper documents merely by using a rubber stamp along with an official's signature. Paper documents form the basis of today's business transactions and will continue to occupy an important place in commercial life. Unfortunately, forgery and paper documents go hand in hand.

Forgery of paper documents is becoming easier than ever before with the advancement being made in the technology of computers, scanners, printers and copiers. It is increasingly becoming possible to tamper with all kinds of valuable paper documents like checks, gift certificates, transcripts and legal documents. Documents can be counterfeited or the content, value, or ownership may be altered by forgery of the documents. Similarly, information could be altered so that rights and privileges are awarded to the wrong individual. In such scenarios, security practices for paper documents are required in order to:

a) Authenticate the document source
b) Verify integrity of the information on the document, and
c) Distinguish copies from originals.

Advanced digital devices can be of assistance in this regard and various approaches have been proposed, see for instance US 2004/0100363 A1.

This invention reported here provides a simple, convenient and cost-effective method for carrying out all the operations described above without necessarily requiring major changes in operating procedures at an organization level and/or major investments in infrastructure.

BRIEF DESCRIPTION OF THE DRAWINGS

An embodiment of the invention will now be described, by way of example only, with reference to the accompanying drawings in which.

DETAILED DESCRIPTION OF THE PREFERRED EMBODIMENT

The anti-counterfeiting technique for documents described in this invention is based on the concept of linking the paper document with an object, such as a digital device, which cannot easily be duplicated to create a "non-copiable object pair" (NCOP), which cannot be duplicated. The paper document is defined as any precise copy of the original document which carries machine readable information helping link the document to the digital device; the non-copiability of the NCOP arises from the fact that one part of it, the unique object, is not copiable. The system described can effectively reduce the risk of forgery, traditionally associated with paper documents. The document and object together certify the ownership or the privilege of the person producing the NCOP for verification. The integrity and authenticity of the information content in the document is ensured by the digital signature of a human signatory, which is a part of the document.

The present implementation reduces the risk of forgery and fraud by employing digital devices, such as smart cards, to verify the reliability of the document in question; and, after establishing the reliability of the document, it verifies that the NCOP has been presented. Faithful photocopying of the document alone for passing it off as the original or forging of a document from scratch becomes useless in the face of the protection described.

Figure 1:
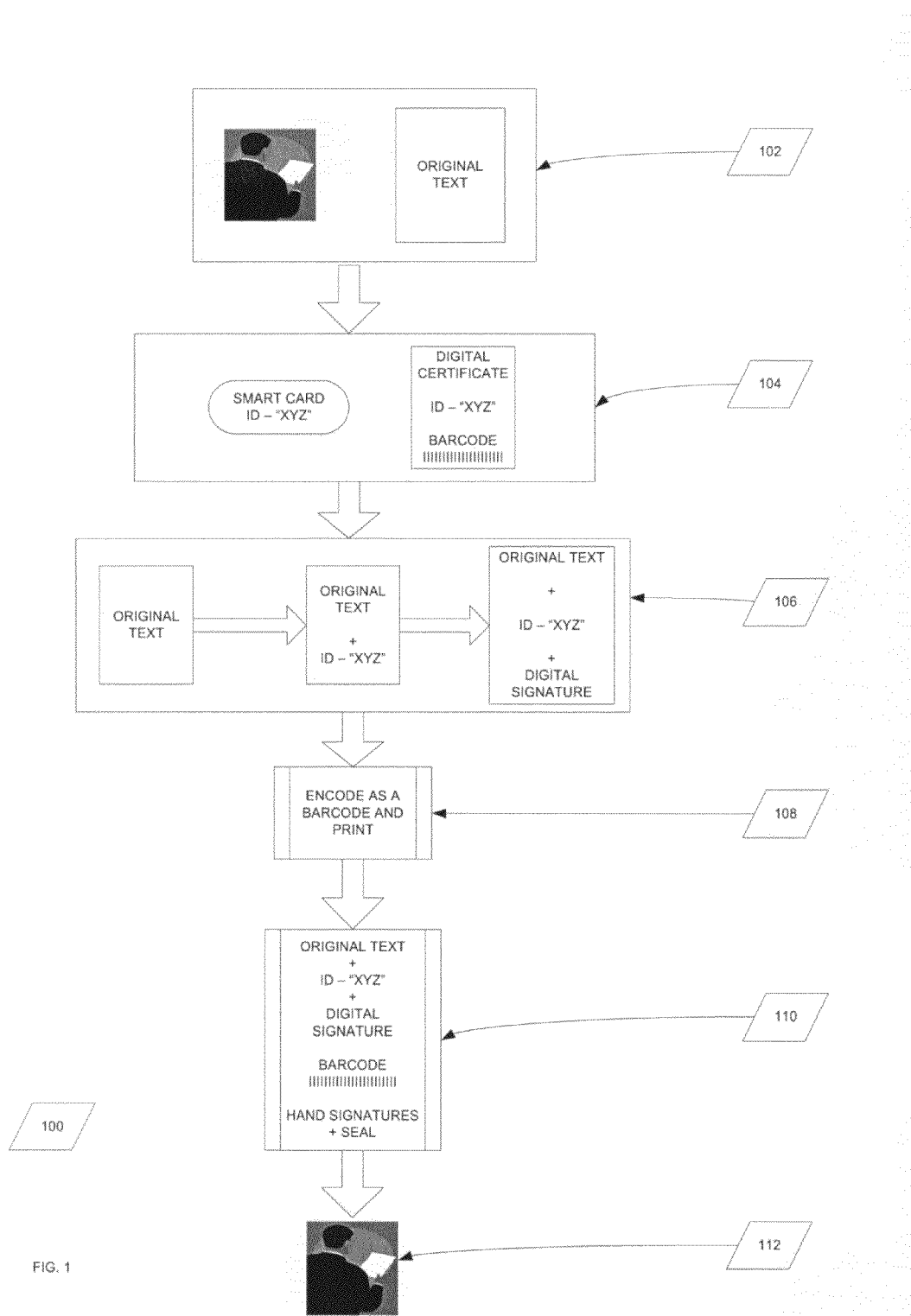
FIG. 1 is a block diagram that illustrates a method for preparing a document.

FIG. 1 is a block diagram that illustrates a method 100 for preparing a document for authentication. The present embodiment is described with reference to a real life application of registering a document with a document-registering office. The embodiment described herein employs a smart card as the digital device. However, it is to be understood that other digital devices or other objects, such as, but not limited to, bank notes, etc., that cannot easily be forged can be equally employed. The key feature of the object concerned is that it has a unique descriptor and it cannot be copied.

A smart card is defined as any pocket-sized card that contains one or more semiconductor chips, such as, but not limited to, a contact card, a contactless smart card, a combi card, a hybrid card, a proximity card, a memory card, a processor card, a magnetic card or an optical card. It is generally similar to a credit card in size and shape and may, for instance, contain information about the individual authorized to use it. The information, which may include access codes, account numbers, electronic cash etc, is usually accessed by using a card reader, which may or may not be contactless.

As digital identification cards, the smart cards can be used for providing a non-copiable identity. One way of doing it is in conjunction with a Public Key Infrastructure (PKI).

A PKI is a system which includes companies, people and technologies that verify and authenticate the validity of each party involved in a digital transaction. The key to PKI is a technology called asymmetric cryptography. The asymmetric cryptography relies on two separate keys: a private key and a public key, to both lock and unlock a message. A private key is a number generated by a special mathematical function and is the main tool used to create a digital signature. It is known only to the person who generates it, and should be kept secret.

A public key is a number that allows another person to "unlock" a signature in order to validate both the document and the signer's identity. The public key is generated with the private key and the two are mathematically related. Because of the nature of the key generation algorithms, it is virtually impossible to deduce the private key from the public key or its signature. Together, a private key and a public key constitute a key pair. The public key need not be kept secret and is typically published in the form of a digital certificate.

A digital certificate is like a digital identity card that can contain an assortment of information such as the name and address of the certificate holder, the holder's public key, the certificate's date of issue and expiration, a validation stamp by the agency issuing the certificate etc. It is issued by a certification authority (CA) which may use a variety of sources such as identifications cards, driving license, electoral cards, ration cards, passports, etc. to vouch for a person's identity before issuing a certificate. Once a certificate is issued, the certificate holder can sign a digital document by using their private key. The digital signature is embedded within the original document and can be verified by using the public key of the user who locked it.

For any data to be digitally signed, a cryptographic function is used to create a hash that is signed by the card using the private signature key also stored inside the card. Although only the cardholder can sign a document, anyone can check the signature using the corresponding public key. A smart card can be used to store a digital certificate issued by the concerned PKI authority, usually called a Certifying Authority or CA, carrying relevant or needed information about the card holder in a tamper-resistant manner. This is achieved by the CA digitally signing the digital certificate.

In the embodiment described here, the digital certificate of the document-registering authority can be stored in the smart card forming part of the NCOP.

Referring now to FIG. 1, at step 102, the content of a document to be authenticated or registered is made available to a document-registering office (or authority) in a machine-readable format stored on a storage medium.

The term "content", as used herein, may refer to text, compressed text, graphics, images, compressed images or any combination of them.

The term "document-registering office", as used herein, refers to any office, authority (governmental or non-governmental), merchant establishment, business organization, firm, company or corporate house. The term is meant to encompass any organization, which is capable of authenticating a document.

The term machine-readable, as used herein, means any information encoded in a form which can be read by a machine, including through the use of technologies such as, but not limited to, optical character recognition. A suitable scanner may be employed to obtain the machine-readable format of a paper document.

The storage media may include any memory device, such as, but not limited to, a hard drive, a compact disc (CD), a digital video disc (DVD), a floppy disc, pen drive, a magnetic tape, a memory drive, a read only memory (ROM) or a random access memory (RAM).

At step 104, an authorized staff member of the document-registering office, who is going to authenticate, register and issue the protected document, takes out a smart card, and determines the identification code (ID) associated with the smart card.

The smart cards used in this embodiment each are associated with a unique private-key that is stored in the card. This private key is in addition to any digital certificate carried by that smart card. Each smart card is also associated with an identification code (ID) that is contained in the digital certificate associated with the smart card. Additionally, it may be printed or embossed on the outside of the card. The identification code may consist of numbers, alphabets, special symbols or characters, or a combination thereof. It will be appreciated that such smart cards can readily be fabricated in large quantities in a batch process. The key pairs and ID codes can be created in advance and do not have to be created or issued on individual application. Therefore, it is envisaged that a document-registering office can simply order stocks of the cards in advance from a central authority or manufacturer.

The associated digital certificate can be provided both by the smart card and an accompanying paper document which carries the certificate in the form of a human readable text along with an accurately machine-readable version.

In the present embodiment, the digital certificate associated with each smart card is provided as a machine-readable version in the form of a 2D barcode with error correction information. However, it should be understood that the other forms of barcodes such as a linear barcode or stacked barcode may equally be employed.

At step 106, the authorized staff member edits the content of the document to add a note to the effect that the document provides a proof of ownership or entitlement only when it is presented for inspection along with the smart card which has the specified ID. He may also add registration details such as a Registration Number to the document's content. The authorized staff member then uses the private key of the document-registering office to digitally sign the edited content of the document.

The process of using a private key to digitally sign a document is well known in the art. The following lines describe one version of the process of digitally signing a document. The process begins with an unsigned document. Once a digital document is ready to be signed, the document's numerical code (digitally, a document is essentially a series of ones and zeroes) is processed through mathematical algorithm called a hash function (or hash algorithm). This action results in a piece of data, which acts like a document fingerprint, which is unique to the document. Once the document fingerprint has been created, a private key is used to encrypt the document fingerprint, resulting in a digital signature. The digital signature is embedded within, or appended to, the content of the original document to create a digitally signed document. As stated above, in the present embodiment, the private key of the document-registering office is used to digitally sign the text of the document.

At step 108, the authorized staff member prints the signed digital document in a machine-readable format, such as, but not limited to, a 2D barcode, linear barcode or stacked barcode, with error correction information. A human readable version of the signed document may also be printed along with the machine-readable version.

At step 110, the print out of the document is hand signed by the parties concerned, and processed as per the official procedure of the registering authority. It typically may involve registering the document and attesting the document by affixing a handwritten signature and a rubber stamp of the registering authority, for instance.

At step 112, the recipient is given the printed document along with the smart card and a copy of its digital certificate.

Figure 2:
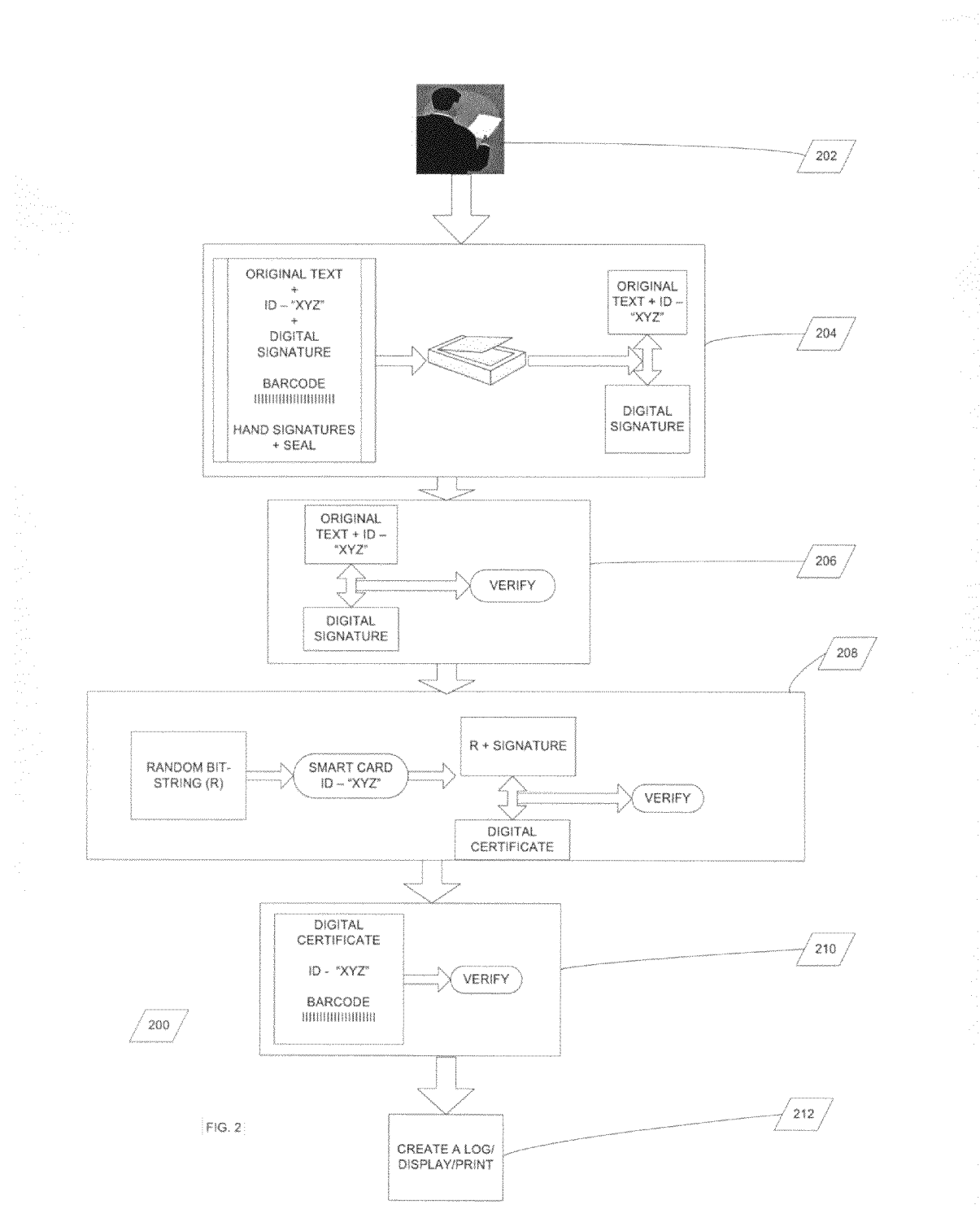
FIG. 2 is a block diagram that illustrates a method for verifying the authenticity of a document.

FIG. 2 is a block diagram that illustrates a method 200 for verifying the authenticity of a document prepared in the above described manner.

At step 202, on demand by an inspecting authority, the recipient presents the printed document for verification along with the smart card and digital certificate.

The term "inspecting authority", as used herein, may be used to refer to any office, authority (governmental or non-governmental), merchant establishment, business organization, firm, company or corporate house. The term is meant to encompass any organization, which is capable of verifying a document.

At step 204, an officer of the inspecting authority uses a scanner to read the machine-readable format of the printed document. The scanning leads to the recovery of the digitally signed document along with the digital signature of the document-registering office.

The scanner used to read the machine-readable format of the printed document may include a barcode scanner, a flatbed scanner, a hand-held scanner, a drum scanner, a rotary scanner, or any other suitable scanning device.

At step 206, the officer of the inspecting authority verifies the digital signature of the document-registering office by using the public key of the document-registering office. The officer also verifies the smart card ID present in the document.

The process of using a public key to verify a digital signature embedded in a document is again well known in the art. Briefly, but not limited to, the process begins with the separation of the original document from the digital signature. The content of the original document is processed using the same hash algorithm that was used when the document was signed. This creates a document fingerprint. Next, the signer's public key is obtained, for instance from a database of the certificate-issuing authorities. The digital certificate contains the signer's public key and is required to unlock a document that has been locked by the signer's corresponding private key. Once the public key has been obtained, it is used to decrypt the digital signature. This results in unlocking of the document fingerprint hidden inside the locked document. The two document fingerprints are then compared. If they match, it proves that the digital signature is valid and the document to which it (digital signature) was attached has not been tampered with in any way. This verifies the authenticity of a digitally signed document.

In the present embodiment, as stated above, the inspecting authority uses the public key of the document-registering office to verify its (document-registering office) digital signature and to validate the document presented to it for verification.

Once the authenticity of the document has been verified, the officer of the inspecting authority compares the smart card ID present in the authenticated document with the ID of the smart card presented by the holder of the document. One would recall that the smart card was presented to the inspecting authority along with the document, at step 202. If the smart card ID in the document corresponds with the ID of the smart card, it proves that the smart card was issued by the document-registering office along with the authenticated document. The presence of a unique common ID in the smart card and the document inextricably links the two components (document and smart card) together, and since it requires an impractical level of effort to duplicate a smart card, it provides a unique way of verifying a document, when both of them are presented together for verification.

Steps 208 and 210 provide additional levels of security to the present method.

At step 208, the inspecting authority may verify the ability of the smart card to affix a digital signature. This is verified by feeding the smart card with bit strings, including random bit strings. It would be recalled that the smart card has a private key loaded into it. If the private key is able to digitally sign these bit strings, the resulting digital signature could be verified by using the corresponding public key, present in the digital certificate accompanying the smart card.

At step 210, if desired, the inspecting authority may also verify the validity of the digital certificate accompanying the smart card by verifying the digital signature of the concerned certification authority who issued it.

As stated above, steps 208 and 210 provide mechanisms to effectively verify the authenticity of a document and its associated smart card.

At step 212, if desired, the inspecting authority may log the verification results and display and/or print them for inspection at a later date.

It will be appreciated that the above described method may be implemented in the form of a computer program, software or computer code, which may be run in any suitable computing environment such as, but not limited to, personal computers, server computers, network computers, hand-held devices or any other computing device, in conjunction with or without an operating system, such as, Microsoft Windows©, Linux and Unix. It can also be performed by a stand alone device such as a Multi Function Printer Scanner combination (MFP), or all-in-one, with firmware designed to carry out all the operations described.

Figure 3:
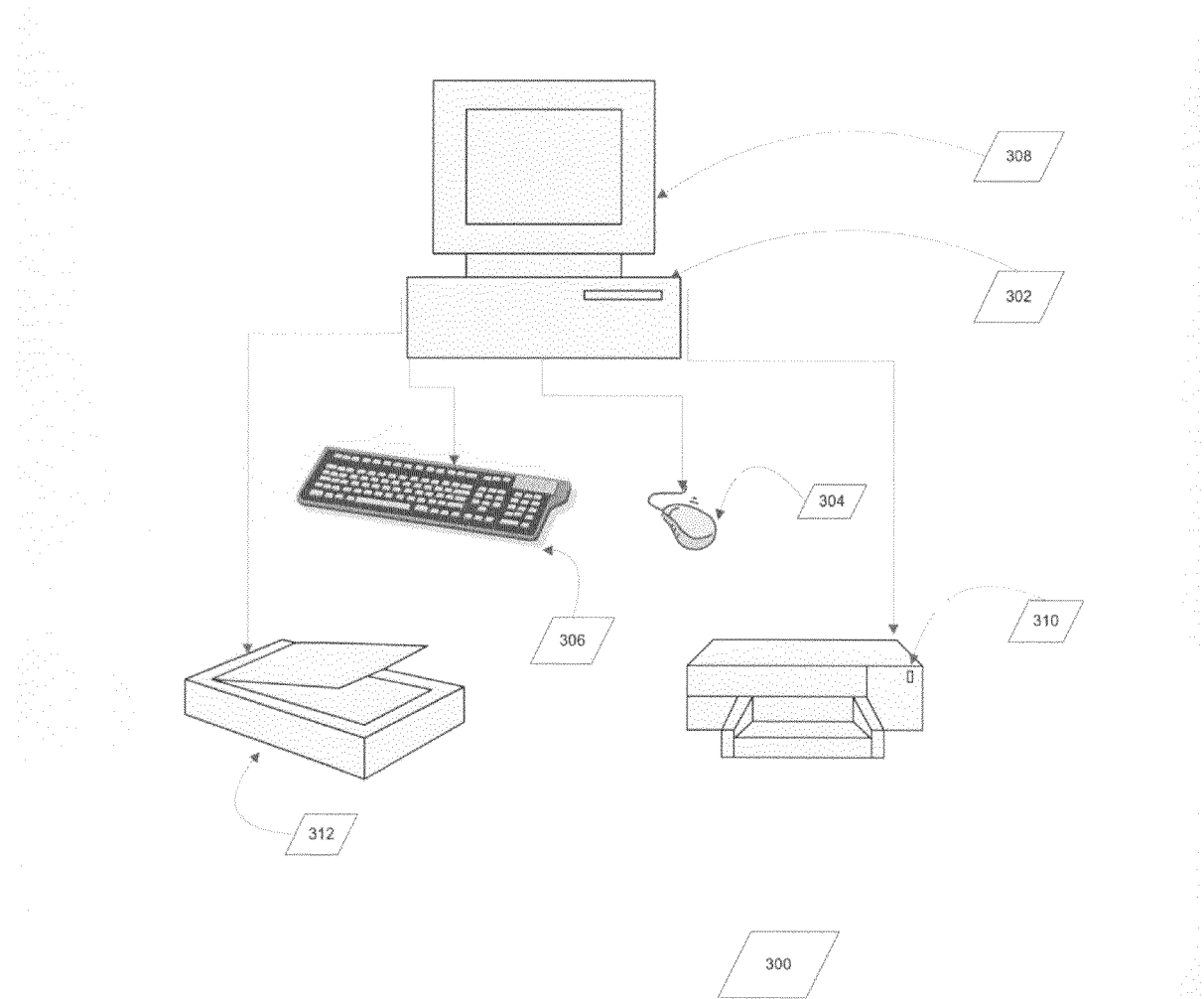
FIG. 3 is an exemplary apparatus for preparation and authentication of a document.

FIG. 3 shows an example of an apparatus 300 for preparation and authentication of a document.

The apparatus 300 may include a computer system 302, a pointing device 304, a keyboard 306, a display device 308, a printer 310, and a scanner 312.

The computer system 302 may include a processing unit, a system memory, a system bus, a removable storage, a non-removable storage and a network interface card. These components are not shown for the sake of simplicity, but would be readily understandable by those skilled in the art. It would be appreciated that the computer system may include a personal computer, a server, a network computer, a peer device and/or any computing device, and it may operate in a networked environment connected to one or more other computer systems. Alternately, it maybe one integrated tamper proof stand alone device akin to an MFP.

A user may enter commands into the computer system 302 through a pointing device 304, keyboard 306 or other input devices. The keyboard and the pointing devise are connected to the computer system through a serial port, a parallel port, a universal serial bus, or through a wireless connection. The pointing device 304 may include a mouse, a game pad, a joy stick and/or any device that controls the movement of the cursor on a display screen.

The display device 308, printer 310 and scanner 312 are also connected to the computer system through an interface. The printer 310 may include a line printer, a dot matrix printer, a daisy wheel printer, an ink jet printer, a laser printer, a thermal printer and/or any printing device. The scanner 312 may include a barcode scanner, a flatbed scanner, a hand-held scanner, a drum scanner, a rotary scanner, a planetary scanner and/or any scanning device.

It would be appreciated that the above described techniques provide a simple, convenient and cost-effective method of verifying paper documents. The method does not require a major change in the present operating procedures at an organization level. No major investment in infrastructure is required since the method can be implemented using simple IT tools such as a PC, scanner, printer etc.

The key pair associated with each smart card requires very little management, as they are created in a batch process, which could even be done at the time of manufacture, and do not have to be created and issued on individual application. The verification work can be done by a dedicated stand alone device such as a modified MFP or a personal computer equipped with a scanner. No complex equipment is necessary. The method can be implemented even with poor or negligible network connectivity, thus providing an effective solution to the problem of document verification in countries or locations where even today network connectivity is not widely available.

Although the description of the preferred embodiment has been presented, different embodiments can be created without deviating from the spirit of the present invention. Many other embodiments will be apparent to those skilled in the art of the subject matter. Accordingly, it is intended that the scope of the present invention be dictated by the appended claims, along with its equivalents, rather than by the description of the preferred embodiment.

The invention claimed is:

1. A method for preparing a verifiable document containing content, said method comprising:
   accessing an identification code and a private key of a smart card of an authenticating agent, wherein the smart card is to be supplied to a user with the verifiable document;
   adding, by the authenticating agent, the identification code of the smart card to an electronic version of the verifiable document that contains the content of the verifiable document to require that the identification code of the smart be accessed to authenticate the verifiable document by an inspecting authority;
   digitally signing the electronic version of the verifiable document using the private key of the smart card;
   editing the content of the verifiable document contained in the electronic version of the document to add a note that the verifiable document provides a proof of ownership or entitlement only when the verifiable document is presented for inspection along with the smart card;
   printing the digitally signed electronic version of the verifiable document in a machine-readable format onto a print medium; and
   supplying the print medium and the smart card to the user.

2. The method of claim 1, wherein printing the digitally signed electronic version of the verifiable document further comprises printing the content of the verifiable document with the digitally signed electronic version of the verifiable document.

3. The method of claim 1, further comprising:
   editing the content of the verifiable document contained in the electronic version of the document to add a note that the verifiable document provides a proof of ownership or entitlement only when the verifiable document is presented for inspection along with the smart card.

4. The method of claim 1, wherein printing the digitally signed electronic version of the verifiable document comprises printing the digitally signed electronic version of the verifiable document as a barcode.

5. A non-transitory computer readable storage medium on which is embedded a computer program, said computer program implementing the method of claim 1.

6. The method of claim 1, wherein a digital certificate of the authenticating agent is stored on the smart card.

7. The method of claim 1, wherein the smart card is under a direct control by the authenticating agent.

8. The method of claim 1, wherein the smart card is not supplied to the user until after the electronic version of the verifiable document is edited to add the identification code associated with the smart card.

9. Apparatus for preparing a verifiable document coupled to a smart card, said apparatus comprising:
   a memory storing:
      code for accessing an identification code and a private key of a smart card of an authenticating agent, wherein the smart card is to be supplied to a user with the verifiable document;
      code for adding, by the authenticating agent, the identification code of the smart card to an electronic version of the verifiable document that contains the content of the verifiable document to require that the identification code of the smart be accessed to authenticate the verifiable document by an inspecting authority;
      code for digitally signing the electronic version of the verifiable document using the private key of the smart card;
      code for editing the content of the verifiable document contained in the electronic version of the document to add a note that the verifiable document provides a proof of ownership or entitlement only when the verifiable document is presented for inspection along with the smart card;
      code for printing the digitally signed electronic version of the verifiable document in a machine-readable form onto a paper verifiable document; and
   a processing unit to implement the code for adding, the code for digitally signing, and the code for printing.

10. The apparatus of claim 9, further comprising code for editing the content of the verifiable document to add a note that the verifiable document provides a proof of ownership or entitlement only when the verifiable document is presented for inspection along with the object having the smart card.

11. The apparatus of claim 9, wherein the code for printing the digitally signed electronic version of the verifiable document in a machine-readable form comprises printing the digitally signed electronic version of the verifiable document as a barcode.

* * * * *

UNITED STATES PATENT AND TRADEMARK OFFICE
CERTIFICATE OF CORRECTION

| | | |
|---|---|---|
| PATENT NO. | : 8,578,168 B2 | Page 1 of 1 |
| APPLICATION NO. | : 11/905478 | |
| DATED | : November 5, 2013 | |
| INVENTOR(S) | : Ramani et al. | |

It is certified that error appears in the above-identified patent and that said Letters Patent is hereby corrected as shown below:

In the Claims

Column 7, line 11, in Claim 1, delete "smart" and insert -- smart card --, therefor.

Column 8, line 17, in Claim 9, delete "smart" and insert -- smart card --, therefor.

Signed and Sealed this
Fourth Day of February, 2014

Michelle K. Lee
*Deputy Director of the United States Patent and Trademark Office*